United States Patent
Pi

(10) Patent No.: US 12,506,501 B2
(45) Date of Patent: Dec. 23, 2025

(54) CIRCUIT AND METHOD FOR DATA TRANSMISSION

(71) Applicant: NEWCOSEMI (BEIJING) TECHNOLOGY CO., LTD, Beijing (CN)

(72) Inventor: Deyi Pi, Beijing (CN)

(73) Assignee: NEWCOSEMI (BEIJING) TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/823,316

(22) Filed: Sep. 3, 2024

(65) Prior Publication Data
US 2025/0096826 A1    Mar. 20, 2025

(30) Foreign Application Priority Data

Sep. 18, 2023   (CN) .......................... 202311201630.0

(51) Int. Cl.
*H03K 19/20*  (2006.01)
*H04B 1/04*   (2006.01)

(52) U.S. Cl.
CPC ............... *H04B 1/04* (2013.01); *H03K 19/20* (2013.01); *H04B 2001/0491* (2013.01)

(58) Field of Classification Search
CPC ........ G11C 7/10; G11C 11/4063; H03K 5/04; H03K 5/15; H03K 7/08; H03K 19/00; H03K 19/20; H03K 19/017; H03L 7/00; H03L 7/16; H03L 7/081; H03L 7/197; H04B 1/04; H04B 1/7073; H04B 10/158; H04L 7/02

USPC ................ 327/161, 172, 175, 295; 375/219, 375/295–297
See application file for complete search history.

(56) References Cited

U.S. PATENT DOCUMENTS

| | | | |
|---|---|---|---|
| 2008/0315920 A1 | 12/2008 | Hung et al. | |
| 2018/0006635 A1* | 1/2018 | Shi | ........................ H03K 5/1534 |
| 2021/0409026 A1* | 12/2021 | Pi | .............................. H03L 7/16 |
| 2023/0111644 A1* | 4/2023 | Rohleder | .............. H04B 14/026 320/108 |

FOREIGN PATENT DOCUMENTS

| | | | |
|---|---|---|---|
| CN | 100568738 C | * | 12/2009 |
| CN | 112003604 A |   | 11/2020 |

(Continued)

*Primary Examiner* — Shawkat M Ali
(74) *Attorney, Agent, or Firm* — Workman Nydegger

(57) ABSTRACT

A circuit and a method for data transmission are provided. The signal generator receives at least one data signal from a transmitter, generates a pulse signal based on the clock signal, the data signal and a first predetermined rule, and transmits the pulse signal to the first signal synthesizer. The first signal synthesizer synthesizes the pulse signal and the clock signal to obtain a synthesized signal, and transmits the synthesized signal to the voltage comparator. The voltage comparator obtains the data signal based on the synthesized signal. According to the present disclosure, the pulse signal is generated based on the clock signal, the first predetermined rule, and the data signal received from the transmitter. The pulse signal and the clock signal are synthesized to obtain a synthesized signal, and the synthesized signal is transmitted to the receiver. The receiver obtains the data signal based on the synthesized signal.

10 Claims, 7 Drawing Sheets

(56) References Cited

FOREIGN PATENT DOCUMENTS

| | | |
|---|---|---|
| CN | 212543758 U | 2/2021 |
| CN | 114513199 A | 5/2022 |
| CN | 114928350 A | 8/2022 |
| CN | 217643317 U | 10/2022 |

* cited by examiner

CIRCUIT AND METHOD FOR DATA TRANSMISSION

The present application claims the priority to Chinese Patent Application No. 202311201630.0, titled "CIRCUIT AND METHOD FOR DATA TRANSMISSION", filed on Sep. 18, 2023 with the Chinese Patent Office, which is incorporated herein by reference in its entirety.

FIELD

The present disclosure relates to the technical field of electronic circuits, and in particular to a circuit and a method for data transmission.

BACKGROUND

Presently, the data rate in communication systems is increasing, and a high data transmission performance is required. To reduce the difficulty and complexity of designing communication circuits, it is required to simplify the circuit structure while ensuring the data transmission performance.

In the conventional technology, data transmission is generally performed in the following three manners. In a first manner, a data signal and a clock signal is transmitted separately, thus the number of circuit lines are increased. In a second manner, the clock signal is embedded in the data signal to be transmitted, thus it is required to firstly recover the clock signal at the receiver by using a complex clock recovery circuit and then to demodulate the data signal. In a third manner, the data signal is modulated, using a modulation method such as a falling-edge modulation method, and then is transmitted, thus it is required to use a circuit, such as a complex time-digital converter, at the receiver to correctly demodulate the data signal. The above three manners may result in the problem of adding the circuit lines or complicating the circuit structure.

Therefore, how to simplify the circuit lines and the circuit structure while ensuring data transmission performance and direct-current balance of the circuit is a problem required to be urgently solved.

SUMMARY

In views of the above, a circuit and a method for data transmission are provided according to the embodiments of the present disclosure, to simplify the circuit lines and the circuit structure while ensuring the data transmission performance.

In achieve the above objectives, the technical solutions are provided according to the embodiments of the present disclosure.

In a first aspect, a circuit for data transmission is provided according to an embodiment of the present disclosure. The circuit includes: a signal generator, a first signal synthesizer and a voltage comparator. An output terminal of the signal generator is connected to an input terminal of the first signal synthesizer. An output terminal of the first signal synthesizer is connected to an input terminal of the voltage comparator. A clock terminal of the signal generator and a clock terminal of the first signal synthesizer are configured to receive a clock signal externally inputted. The signal generator is configured to receive at least one data signal from a transmitter, generate a pulse signal based on the clock signal, the data signal and a first predetermined rule, and transmit the pulse signal to the first signal synthesizer. The first signal synthesizer is configured to synthesize the pulse signal and the clock signal to obtain a synthesized signal, and transmit the synthesized signal to the voltage comparator. The voltage comparator is configured to obtain the data signal based on the synthesized signal.

In an embodiment, the signal generator includes a first signal unit, a second signal unit and a second signal synthesizer. A clock terminal of the first signal unit and a clock terminal of the second signal unit are configured to receive the clock signal externally inputted. An output terminal of the first signal unit and an output terminal of the second signal unit are connected to an input terminal of the second signal synthesizer. An output terminal of the second signal synthesizer is connected to the input terminal of the first signal synthesizer. The first signal unit is configured to receive a first data signal from the transmitter, generate a first to-be-synthesized pulse signal based on the clock signal, the first data signal and a first predetermined rule. The second signal unit is configured to: invert a phase of the clock signal to obtain a phase-inverted clock signal, receive a second data signal from the transmitter, generate a to-be-negative pulse signal based on the phase-inverted clock signal, the second data signal and the first predetermined rule, and perform negative processing on the to-be-negative pulse signal to obtain a second to-be-synthesized pulse signal. The second signal synthesizer is configured to synthesize the first to-be-synthesized pulse signal and the second to-be-synthesized pulse signal to obtain the pulse signal.

In an embodiment, the first signal unit includes a first delayer, a second delayer and a first AND gate. An output terminal of the first delayer is connected to an input terminal of the second delayer and a second input terminal of the first AND gate. A clock terminal of the first delayer is configured to receive the clock signal externally inputted. An output terminal of the second delayer is connected to a third input terminal of the first AND gate. An output terminal of the first AND gate is connected to the input terminal of the second signal synthesizer. A first input terminal of the first AND gate is configured to receive the first data signal from the transmitter. The first delayer is configured to perform delay processing on the clock signal to obtain a first clock signal. The second delayer is configured to perform delay processing on the first clock signal to obtain a second clock signal. The first AND gate is configured to receive the first data signal from the transmitter, and perform an AND operation on the first clock signal, the second clock signal and the first data signal to obtain the first to-be-synthesized pulse signal.

In an embodiment, the second signal unit includes a third delayer, a fourth delayer, a second AND gate, an inverter and a negative converter. An output terminal of the inverter is connected to an input terminal of the third delayer. A clock terminal of the inverter is configured to receive the clock signal externally inputted. An output terminal of the third delayer is connected to an input terminal of the fourth delayer and a second input terminal of the second AND gate. An output terminal of the fourth delayer is connected to a third input terminal of the second AND gate. A first input terminal of the second AND gate is configured to receive the second data signal from the transmitter. The inverter is configured to invert the phase of the clock signal to obtain the phase-inverted clock signal. The third delayer is configured to perform delay processing on the phase-inverted clock signal to obtain a third clock signal. The fourth delayer is configured to perform delay processing on the third clock signal to obtain a fourth clock signal. The second AND gate is configured to receive the second data signal from the transmitter, and perform an AND operation on the third clock signal, the fourth clock signal and the second data signal to obtain the to-be-negative pulse signal. The negative converter is configured to perform negative processing on the to-be-negative pulse signal to obtain the second to-be-synthesized pulse signal.

In an embodiment, the negative converter is further configured to: convert a positive pulse in the to-be-negative pulse signal to a negative pulse; and/or convert a negative pulse in the to-be-negative pulse signal to a positive pulse.

In an embodiment, the first predetermined rule includes multiple predetermined sub-rules, and the predetermined sub-rules correspond to the number of the data signal received by the signal generator. The signal generator is further configured to: receive the at least one data signal from the transmitter; select a target predetermined sub-rule corresponding to the number of the data signal from the multiple predetermined sub-rules; and generate the pulse signal based on the clock signal, the data signals and the target predetermined sub-rule, and transmit the pulse signal to the first signal synthesizer.

In an embodiment, the circuit further includes a first driver. An input terminal of the first driver is connected to the output terminal of the signal generator. An output terminal of the first driver is connected to the input terminal of the first signal synthesizer. The first driver is configured to convert a level of the pulse signal outputted by the signal generator to meet a predetermined first level requirement.

In an embodiment, the circuit further includes a second driver. An output terminal of the second driver is connected to the input terminal of the first signal synthesizer. An input terminal of the second driver is configured to receive the clock signal. The second driver is configured to convert a level of the clock signal to meet a predetermined second level requirement.

In an embodiment, the voltage comparator is further configured to: determine, for each of cycles of the synthesized signal, a data signal value corresponding to the cycle based on a level of the synthesized signal in the cycle and a second predetermined rule; and obtain the data signal based on data signal values corresponding to all the cycles.

In a second aspect, a method for data transmission is provided according to an embodiment of the present disclosure. The method is applied to the circuit for data transmission according to the embodiments of the present disclosure described in the first aspect. The method includes: receiving the at least one data signal from the transmitter; generating the pulse signal based on the clock signal, the data signal and the first predetermined rule; synthesizing the pulse signal and the clock signal to obtain the synthesized signal; and obtaining the data signal based on the synthesized signal.

Based on the circuit and the method for data transmission according to the embodiments of the present disclosure, the circuit includes: a signal generator, a first signal synthesizer and a voltage comparator. An output terminal of the signal generator is connected to an input terminal of the first signal synthesizer. An output terminal of the first signal synthesizer is connected to an input terminal of the voltage comparator. A clock terminal of the signal generator and a clock terminal of the first signal synthesizer are configured to receive a clock signal externally inputted. The signal generator is configured to receive at least one data signal from a transmitter, generate a pulse signal based on the clock signal, the data signal and a first predetermined rule, and transmit the pulse signal to the first signal synthesizer. The first signal synthesizer is configured to synthesize the pulse signal and the clock signal to obtain a synthesized signal, and transmit the synthesized signal to the voltage comparator. The voltage comparator is configured to obtain the data signal based on the synthesized signal. According to the present disclosure, the pulse signal is generated based on the clock signal, the first predetermined rule, and the data signal received from the transmitter. The pulse signal and the clock signal are synthesized to obtain a synthesized signal, and the synthesized signal is transmitted to the receiver. The receiver obtains the data signal based on the synthesized signal. Therefore, the data signal is transmitted using the pulse signal and the clock signal without adding circuit lines or complicating circuit structure, ensuring the data transmission performance while simplify the circuit lines and the circuit structure, and realizing direct-current balance of the circuit.

BRIEF DESCRIPTION OF THE DRAWINGS

For clearer illustration of the technical solutions according to embodiments of the present disclosure or according to the conventional technology, the drawings to be used in the description of the embodiments or the conventional technology are briefly described below. Apparently, the drawings in the following descriptions show only some embodiments of the present disclosure, and other drawings may be obtained by those skilled in the art according to the drawings without any creative effort.

DETAILED DESCRIPTION

The technical solutions according to the embodiments of the present disclosure will be described clearly and completely as follows in conjunction with the drawings in the embodiments of the present disclosure. It is apparent that the described embodiments are only some of the embodiments according to the present disclosure, rather than all the embodiments. Based on the embodiments of the present disclosure, any other embodiments obtained by those skilled in the art without any creative efforts fall within the protection scope of the present disclosure.

In the present disclosure, the terms "include", "comprise" or any other variants are intended to be non-exclusive. Therefore, a process, method, article or device including a series of elements include not only these elements but also other elements that are not clearly enumerated, or further include elements inherent in the process, method, article or device. Unless expressively limited, the statement "including a . . . " does not exclude the case that other similar elements may exist in the process, method, article or device including the series of elements.

It can be known from the background that the conventional method for data transmission has the problem of adding circuit lines or complicating circuit structure.

Therefore, a circuit and a method for data transmission are provided according to the embodiments of the present disclosure. According to the present disclosure, the pulse signal is generated based on the clock signal, the first predetermined rule, and the data signal received from the transmitter. The pulse signal and the clock signal are synthesized to obtain a synthesized signal, and the synthesized signal is transmitted to the receiver. The receiver obtains the data signal based on the synthesized signal. Therefore, the data signal is transmitted using the pulse signal and the clock signal without adding circuit lines or complicating circuit structure, ensuring the data transmission performance while simplify the circuit lines and the circuit structure.

Figure 1:
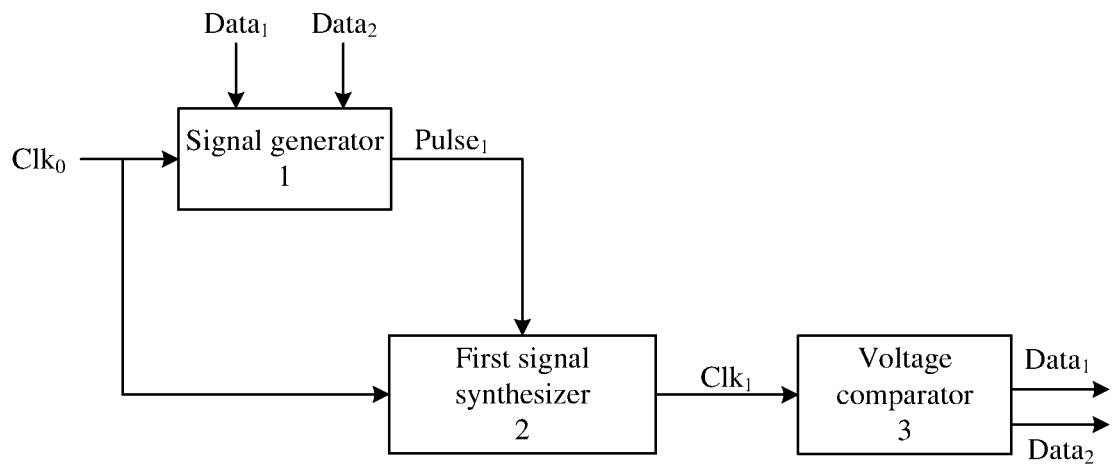
FIG. 1 is a schematic diagram of a circuit for data transmission according to an embodiment of the present disclosure.

Reference is made to FIG. 1, which is a schematic diagram of a circuit for data transmission according to an embodiment of the present disclosure. The circuit for data transmission includes a signal generator 1, a first signal synthesizer 2 and a voltage comparator 3.

Multiple input terminals of the signal generator 1 receive data signals from a transmitter, and an output terminal of the signal generator 1 is connected to an input terminal of the first signal synthesizer 2. An output terminal of the first signal synthesizer 2 is connected to an input terminal of the voltage comparator 3.

It should be noted that in a case that the signal generator 1 receives multiple data signals, the multiple data signals are received through the multiple input terminals of the signal generator 1, and each of the input terminals receives one data signal.

For example, as shown in FIG. 1, the transmitter transmits a data signal $Data_1$ and a data signal $Data_2$ to the signal generator 1 through two input terminals of the signal generator 1.

It should be noted that, in a case that it is required to transmit more than two data signals synchronously, another signal generator 1 may be added to the circuit for data transmission shown in FIG. 1.

A clock terminal of the signal generator 1 and a clock terminal of the first signal synthesizer 2 receive an externally inputted clock signal, that is, $Clk_0$ shown in FIG. 1.

It should be noted that the frequency of the clock signal inputted to the signal generator 1 and the first signal synthesizer 2 may be configured according to the actual requirements.

The signal generator 1 is configured to receive one or more data signals from the transmitter, generate a pulse signal Pulse based on the clock signal $Clk_0$, the data signal and the first predetermined rule, and transmit the pulse signal $Pulse_1$ the first signal synthesizer 2.

It should be noted that the frequency of the pulse signal $Pulse_1$ is consistent with the frequency of the clock signal $Clk_0$, and the pulse width and the pulse position of the pulse signal $Pulse_1$ may be configured according to requirements.

In an embodiment, the first predetermined rule includes multiple different predetermined sub-rules. The predetermined sub-rules correspond to the number of the data signals received by the signal generator 1, meeting the requirements of the transmitter transmitting multiple data signals synchronously.

The signal generator 1 is further configured to: receive one or more data signals from the transmitter, select a target predetermined sub-rule corresponding to the number of data signals from the multiple predetermined sub-rules, generate the pulse signal $Pulse_1$ based on the clock signal, each data signal and the target predetermined sub-rule, and transmit the pulse signal $Pulse_1$ to the first signal synthesizer 2.

For example, a first predetermined sub-rule, a second predetermined sub-rule and a third predetermined sub-rule are provided, the first predetermined sub-rule corresponds to one data signal, the second predetermined sub-rule corresponds to two data signals, the third predetermined sub-rule corresponds to three data signals. In a case that the signal generator 1 receives two data signals, the second predetermined sub-rule is determined as the target predetermined sub-rule, and the pulse signal $Pulse_1$ is generated based on the clock signal, the two data signals and the target predetermined sub-rule.

Figure 2:
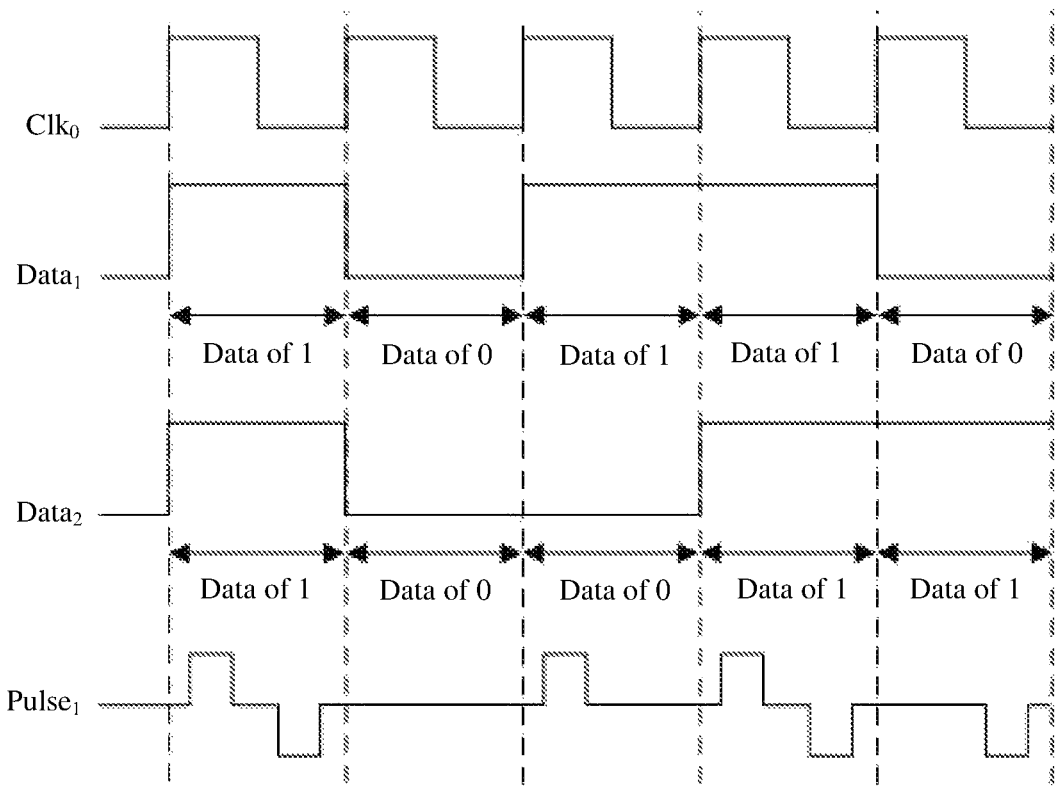
FIG. 2 is a schematic diagram of generating a pulse signal based on a clock signal and a data signal according to an embodiment of the present disclosure.

Reference is made to FIG. 2, which is a schematic diagram of generating a pulse signal based on a clock signal and a data signal according to an embodiment of the present disclosure.

In an embodiment of the present disclosure, the data signals inputted to the signal generator 1 are illustrated by taking a data signal $Data_1$ and a data signal $Data_2$ as an example.

The signal generator 1 receives two data signals, and a target predetermined sub-rule corresponding to the number of the data signals is selected from the first predetermined rule. For example, the target predetermined sub-rule includes:

generating a positive pulse in a case that the data signal $Data_1$ is 1 at a rising edge of the clock signal $Clk_0$;

generating no pulse in a case that the data signal $Data_1$ is 0 at a rising edge of the clock signal $Clk_0$;

generating a negative pulse in a case that the data signal $Data_2$ is 1 at a falling edge of the clock signal $Clk_0$; and generating no pulse in a case that the data signal $Data_2$ is 0 at a falling edge of the clock signal $Clk_0$.

The pulse signal $Pulse_1$ is generated based on the target predetermined sub-rule, the clock signal $Clk_0$, the data signal $Data_1$ and the data signal $Data_2$.

An upward protrusion of the pulse signal $Pulse_1$ is a positive pulse, and a downward protrusion of the pulse signal $Pulse_1$ is a negative pulse.

The width and position of the positive pulse or the negative pulse of the pulse signal $Pulse_1$ are may be configured according to requirements.

For example, the positive pulse or the negative pulse may be configured at a rising edge or a falling edge of the clock signal $Clk_0$, or configured at a high level or a low level of the clock signal $Clk_0$. The width of the positive pulse or the width of the negative pulse is a width of a protrusion, and the width may be configured to be equal to a width of a range of a high level or a low level within a cycle of the clock signal $Clk_0$.

The first signal synthesizer 2 is configured to synthesize the pulse signal Pulse and the clock signal $Clk_0$ to obtain a synthesized signal $Clk_1$, and transmit the synthesized signal $Clk_1$ to the voltage comparator 3.

The specific synthesis rule is not limited, and the following example is provided for illustration.

For example, in a same cycle, in a case that the clock signal $Clk_0$ is at a high level and the pulse signal $Pulse_1$ is a positive pulse, the clock signal $Clk_0$ at the high level is synthesized with the positive pulse to obtain a level signal greater than the high level of the clock signal $Clk_0$.

In a case that the clock signal $Clk_0$ is at a low level and the pulse signal $Pulse_1$ is a negative pulse, the clock signal $Clk_0$ at the low level is synthesized with the negative pulse to obtain a level signal smaller than the low level of the clock signal $Clk_0$.

Level signals synthesized in all cycles form the synthesized signal $Clk_1$.

The voltage comparator 3 is configured to obtain the data signal based on the synthesized signal $Clk_1$.

The synthesized signal $Clk_1$ is outputted to the receiver, so that the receiver uses the synthesized signal $Clk_1$ as a reference clock.

Figure 3:
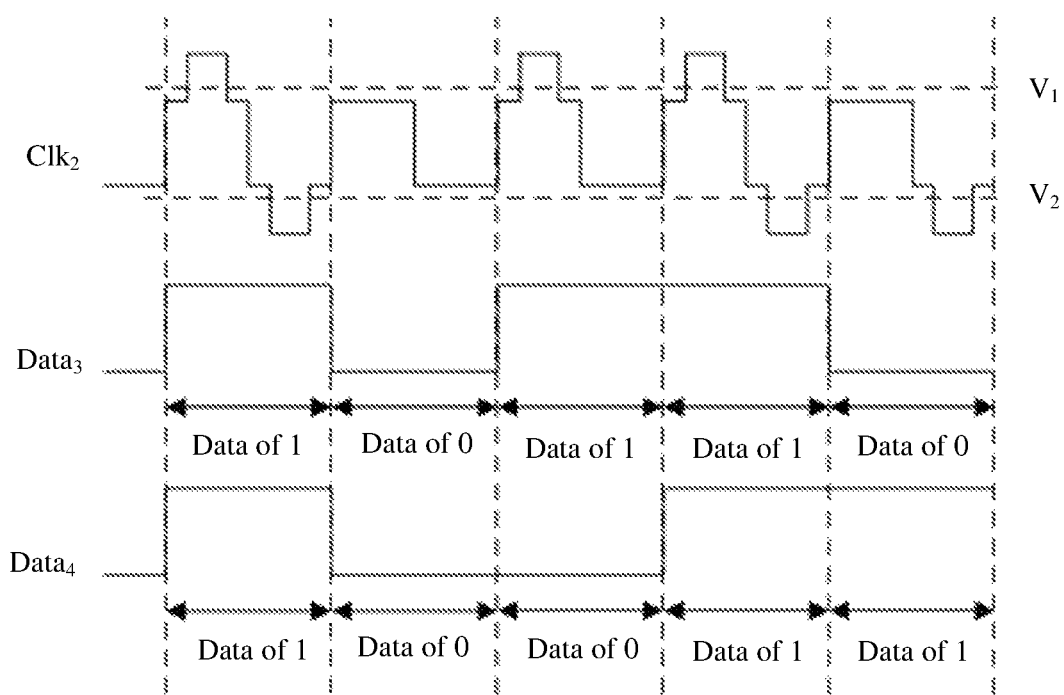
FIG. 3 is a schematic diagram of restoring a synthesized signal according to an embodiment of the present disclosure.

Reference is made to FIG. 3, which is a schematic diagram of restoring a synthesized signal according to an embodiment of the present disclosure.

In a case that the synthesized signal $Clk_1$ includes two data signals, such as the data signal $Data_1$ and the data signal $Data_2$ shown in FIG. 2, then a corresponding restoration rule includes:
  obtaining a data signal Data1 equal to 1 in a case that the voltage of the synthesized signal $Clk_1$ is greater than a first predetermined value $V_1$ in a cycle of the clock signal $Clk_0$;
  obtaining a data signal $Data_1$ equal to 0 and a data signal $Data_2$ equal to 0 in a case that the voltage of synthesized signal $Clk_1$ is less than or equal to the first predetermined value $V_1$ and is greater than or equal to a second predetermined value $V_2$ in a cycle of the clock signal $Clk_0$; and
  obtaining a data signal $Data_2$ equal to 1 in a case that the voltage of the synthesized signal $Clk_1$ is less than the second predetermined value $V_2$ in a cycle of the clock signal $Clk_0$.

As shown in FIG. 3, the two data signals obtained after restoring are consistent with the data signals $Data_1$ and $Data_2$ shown in FIG. 2, indicating that the data transmission is successfully performed.

It should be noted that the first predetermined value $V_1$ and the second predetermined value $V_2$ are configured based on to the level of the synthesized signal $Clk_1$, where the level of the synthesized signal $Clk_1$ is determined based on the levels of the pulse signal $Pulse_1$ and the clock signal $Clk_0$.

That is, in a case that the levels of the pulse signal $Pulse_1$ and the clock signal $Clk_0$ are increased or decreased according to actual requirements, then the level of the synthesized signal $Clk_1$ is increased or decreased correspondingly, and then the first predetermined value $V_1$ and the second predetermined value $V_2$ are required to be adjusted correspondingly.

In an embodiment, the level of the pulse signal $Pulse_1$ and the level of the clock signal $Clk_0$ are converted by using drivers, which is described as follows.

Figure 4:
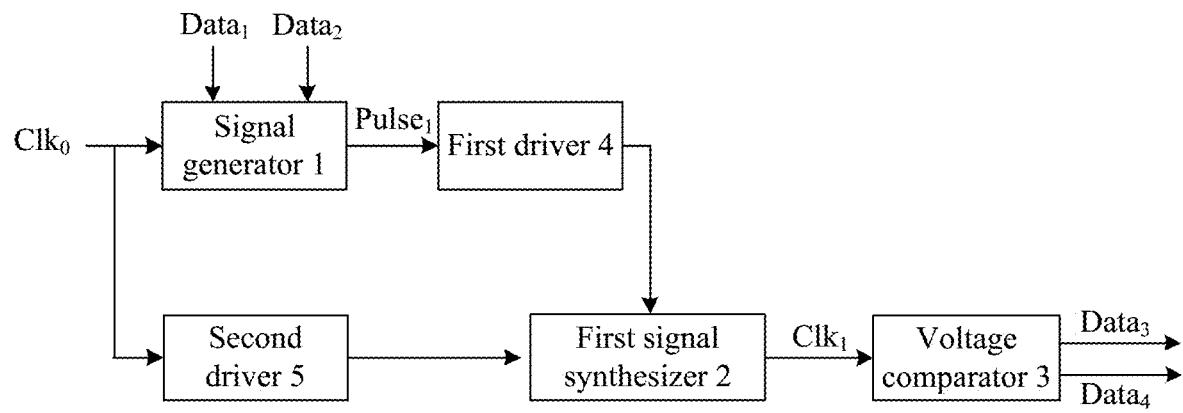
FIG. 4 is a schematic diagram of a circuit for data transmission according to another embodiment of the present disclosure.

On the basis of the circuit for data transmission according to the above embodiments of the present disclosure, FIG. 4 shows a schematic diagram of a circuit for data transmission according to another embodiment of the present disclosure. Compared to FIG. 1, a first driver 4 and a second driver 5 are added. The circuit for data transmission includes: the signal generator 1, the first signal synthesizer 2, the voltage comparator 3, the first driver 4 and the second driver 5.

An input terminal of the first driver 4 is connected to the output terminal of the signal generator 1, and an output terminal of the first driver 4 is connected to the input terminal of the first signal synthesizer 2.

An input terminal of the second driver 5 is configured to receive the clock signal $Clk_0$, and an output terminal of the second driver 5 is connected to the input terminal of the first signal synthesizer 2.

The first driver 4 is configured to convert a level of the pulse signal $Pulse_1$ outputted by the signal generator to meet a predetermined first level requirement.

The second driver 5 is configured to convert a level of the clock signal $Clk_0$ to meet a predetermined second level requirement.

Correspondingly, the first signal synthesizer 2 is configured to synthesize the pulse signal $Pulse_1$ with the converted level and the clock signal $Clk_0$ with the converted level to obtain a synthesized signal $Clk_1$, and transmit the synthesized signal $Clk_1$ to the voltage comparator 3.

It should be noted that the level of the pulse signal $Pulse_1$ and the level of the clock signal $Clk_0$ are converted by using the drivers, so that the transmission efficiency of the synthesized signal $Clk_1$ can be improved, for example, the transmission distance of the synthesized signal $Clk_1$ can be improved.

The circuit for data transmission according to the embodiments of the present disclosure includes: a signal generator, a first signal synthesizer and a voltage comparator. The signal generator receives at least one data signal from a transmitter, generates a pulse signal based on the clock signal, the data signal and a first predetermined rule, and transmits the pulse signal to the first signal synthesizer. The first signal synthesizer synthesizes the pulse signal and the clock signal to obtain a synthesized signal, and transmits the synthesized signal to the voltage comparator. The voltage comparator obtains the data signal based on the synthesized signal. According to the present disclosure, the pulse signal is generated based on the clock signal, the first predetermined rule, and the data signal received from the transmitter. The pulse signal and the clock signal are synthesized to obtain a synthesized signal, and the synthesized signal is transmitted to the receiver. The receiver obtains the data signal based on the synthesized signal. Therefore, the data signal is transmitted using the pulse signal and the clock signal without adding circuit lines or complicating circuit structure, ensuring the data transmission performance while simplify the circuit lines and the circuit structure, and realizing direct-current balance of the circuit.

Figure 5:
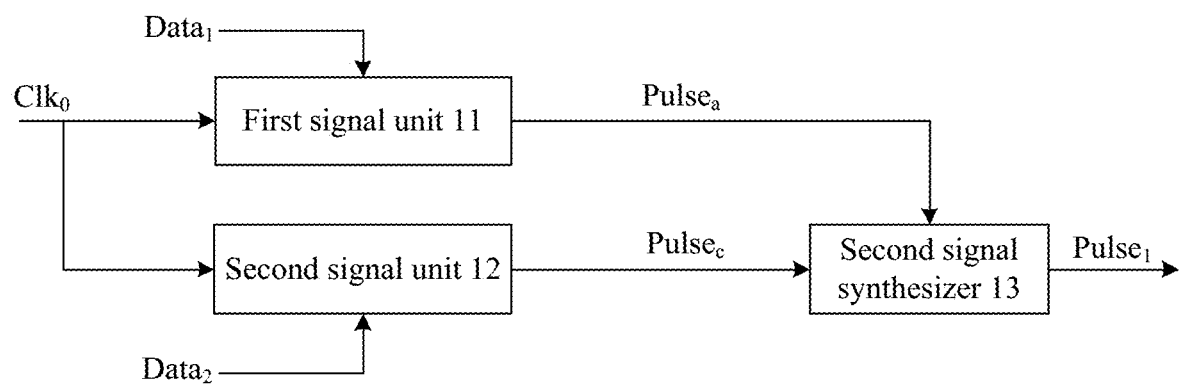
FIG. 5 is a schematic structural diagram of a signal generator according to an embodiment of the present disclosure.

In order to illustrate a structure of the signal generator 1 in the circuit for data transmission according to the above embodiments of the present disclosure, FIG. 5 shows a schematic structural diagram of a signal generator according to an embodiment of the present disclosure. The signal generator 1 includes: a first signal unit 11, a second signal unit 12, and a second signal synthesizer 13.

Each of an input terminal of the first signal unit 11 and an input terminal of the second signal unit 12 receives a data signal from the transmitter. A clock terminal of the first signal unit 11 and a clock terminal of the second signal unit 12 receive the externally inputted clock signal $Clk_0$. An output terminal of the first signal unit 11 and an output terminal of the second signal unit 12 are connected to an input terminal of the second signal synthesizer 13. An output terminal of the second signal synthesizer 12 is connected to the input terminal of the first signal synthesizer.

It should be noted that, in a case that the signal generator 1 receives one data signal from the transmitter, the first signal unit 11 receives and processes the data signal; and in a case that the signal generator 1 receives two data signals from the transmitter, the first signal unit 11 receives and processes one of the two data signals, and the second signal unit 12 receives and processes the other one of the two data signals.

The first signal unit 11 is configured to receive a first data signal from the transmitter, and generate a first to-be-synthesized pulse signal $Pulse_a$ based on the clock signal $Clk_0$, the first data signal and a first predetermined rule.

The second signal unit 12 is configured to: invert a phase of the clock signal $Clk_0$ to obtain a phase-inverted clock signal, receive a second data signal from the transmitter, generate a to-be-negative pulse signal $Pulse_b$ based on the phase-inverted clock signal, the second data signal and the first predetermined rule, and perform negative processing on the to-be-negative pulse signal $Pulse_b$ to obtain a second to-be-synthesized pulse signal $Pulse_c$.

The second signal synthesizer 13 is configured to synthesize the first to-be-synthesized pulse signal $Pulse_a$ and the second to-be-synthesized pulse signal $Pulse_c$ to obtain the pulse signal $Pulse_1$.

It should be noted in a case that only one data signal is received, the first to-be-synthesized pulse signal $Pulse_a$ is used as the pulse signal $Pulse_1$ to be outputted.

Figure 6:
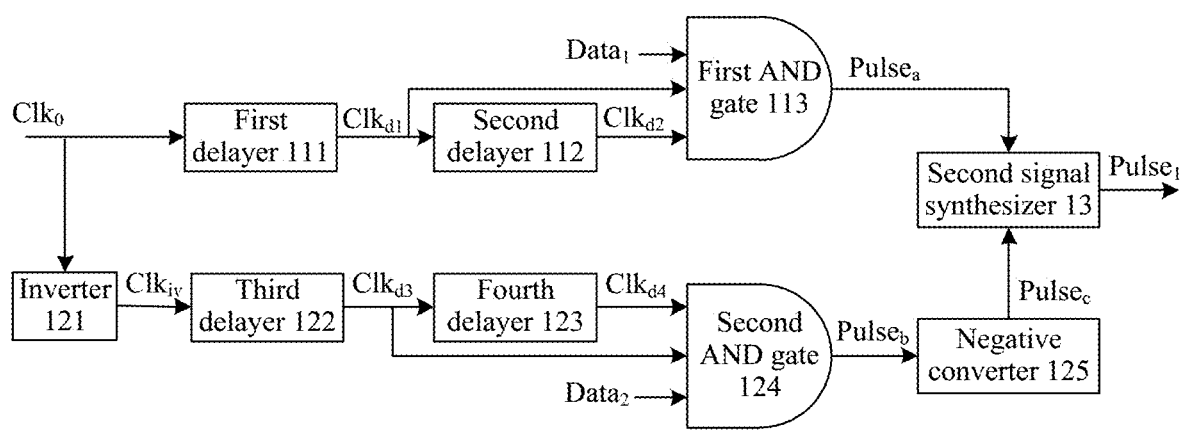
FIG. 6 is a schematic structural diagram of a signal generator according to another embodiment of the present disclosure.

In order to illustrate a structure of the first signal unit 11 and a structure of the second signal unit 12 and a connection between the first signal unit 11 and the second signal unit 12, the signal generator including the first signal unit 11 and the second signal unit 12 is taken as an example for illustrating in an embodiment of the present disclosure. Reference is made to FIG. 6, which is a schematic structural diagram of a signal generator according to another embodiment of the present disclosure.

In the embodiment of the present disclosure, explanation is provided by taking that the first signal unit 11 receives the first data signal $Data_1$ from the transmitter and the second signal unit 12 receives the second data signal $Data_2$ from the transmitter as an example.

The first signal unit 11 includes a first delayer 111, a second delayer 112 and a first AND gate 113.

A clock terminal of the first delayer 111 receives the externally inputted clock signal. An output terminal of the second delayer 112 is connected to a third input terminal of the first AND gate 113. An output terminal of the first AND gate 113 is connected to the input terminal of the second signal synthesizer 12. A first input terminal of the first AND gate 113 receives the first data signal $Data_1$ from the transmitter.

Figure 7:
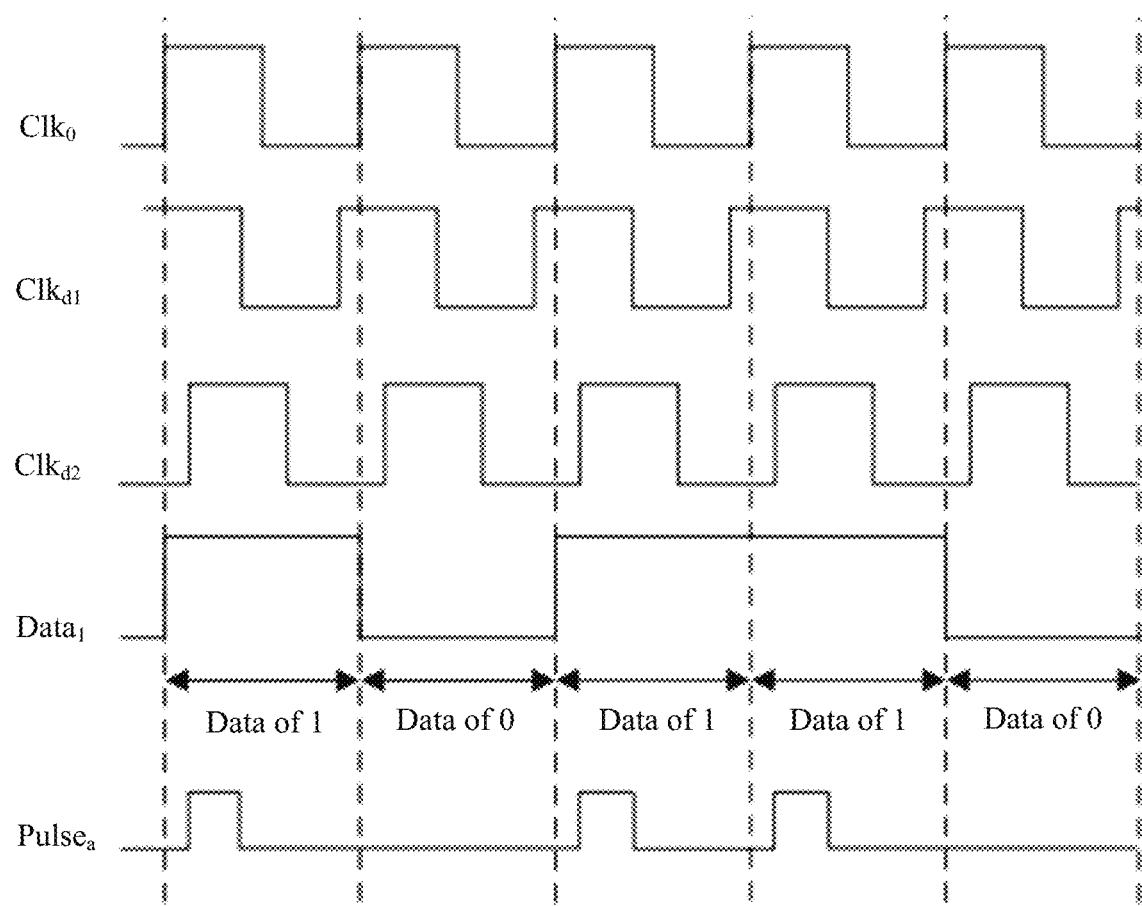
FIG. 7 is a schematic diagram of generating a to-be-synthesized pulse signal according to an embodiment of the present disclosure.

Reference is made to FIG. 7, which is a schematic diagram of generating a to-be-synthesized pulse signal according to an embodiment of the present disclosure.

The first delayer 111 is configured to perform delay processing on the clock signal $Clk_0$ to obtain a first clock signal $Clk_{d1}$.

The second delayer 112 is configured to perform delay processing on the first clock signal $Clk_{d1}$ to obtain a second clock signal $Clk_{d2}$.

As shown in FIG. 7, after the delay processing, the cycles of the clock signal $Clk_0$, the first clock signal $Clk_{d1}$ and the second clock signal $Clk_{d2}$ are misaligned.

The first AND gate 113 is configured to receive the first data signal $Data_1$ from the transmitter.

Then, first AND gate 113 performs an AND operation on the first clock signal $Clk_{d1}$, the second clock signal $Clk_{d2}$ and the first data signal $Data_1$ to obtain the first to-be-synthesized pulse signal $Pulse_a$ after performing pulse modulation on the first data signal $Data_1$.

As mentioned above, after the signal generator 1 receives two data signals from the transmitter, the target predetermined sub-rule is selected from the first predetermined rule based on the number of data signals. It can be seen from FIG. 7 that the signal processing logic of the first signal unit 11 is consistent with a processing logic of the target predetermined sub-rule corresponding to two data signals.

The second signal unit 12 includes: a third delayer 122, a fourth delayer 123, a second AND gate 124, an inverter 121 and a negative converter 125.

An output terminal of the inverter 121 is connected to an input terminal of the third delayer 122, and a clock terminal of the inverter 121 receives the externally inputted clock signal. An output terminal of the third delayer 122 is connected to an input terminal of the fourth delayer 123 and a second input terminal of the second AND gate 124. An output terminal of the fourth delayer 123 is connected to a third input terminal of the second AND gate 124. A first input terminal of the second AND gate 124 receives the second data signal Data from the transmitter.

Figure 8:
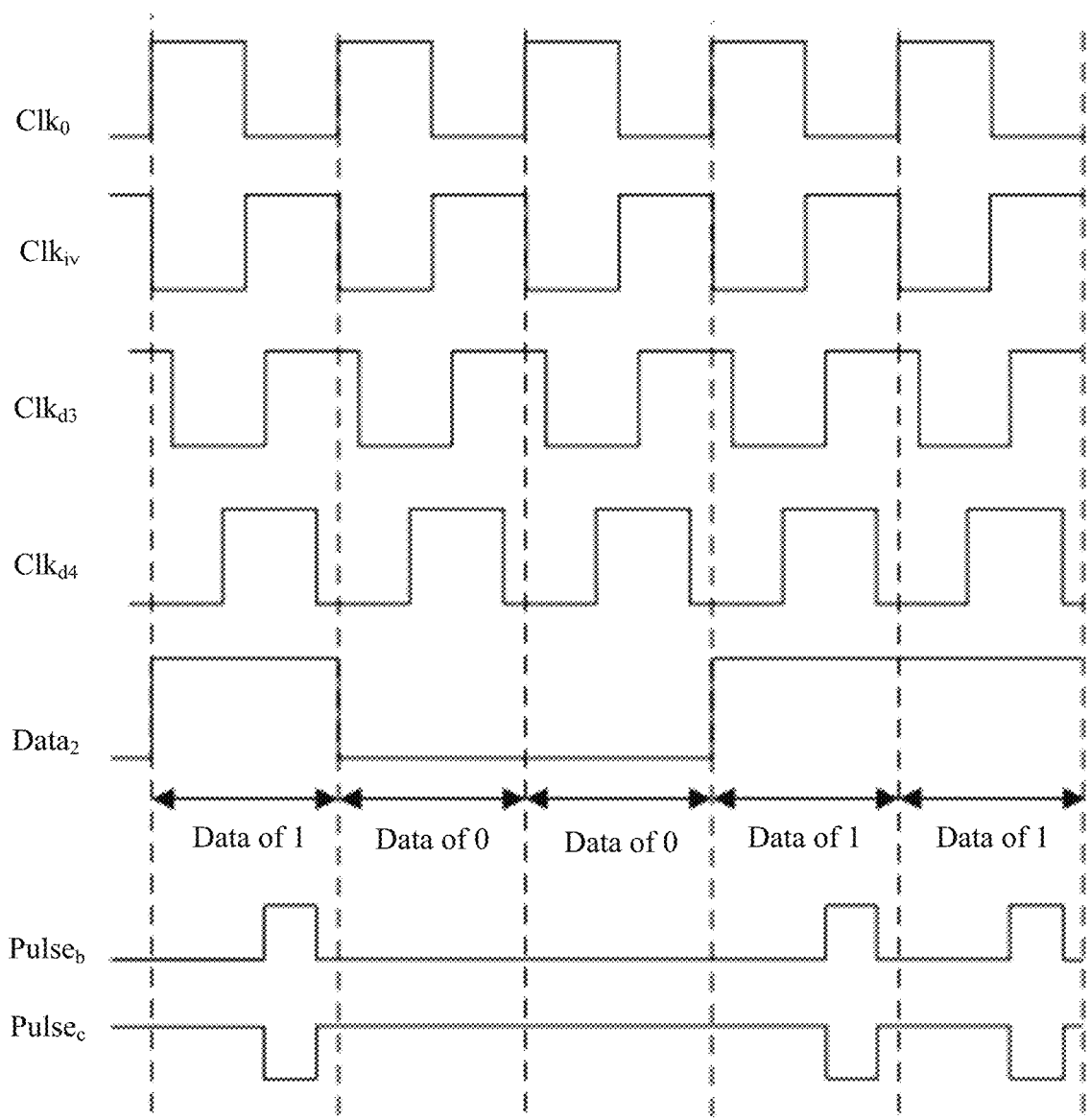
FIG. 8 is a schematic diagram of generating a to-be-synthesized pulse signal according to another embodiment of the present disclosure.

Reference is made to FIG. 8, which is a schematic diagram of generating a to-be-synthesized pulse signal according to another embodiment of the present disclosure.

The inverter 121 is configured to invert the phase of the clock signal $Clk_0$ to obtain a phase-inverted clock signal $Clk_{iv}$, which is shown in FIG. 8.

The third delayer 122 is configured to perform delay processing on the phase-inverted clock signal $Clk_{iv}$ to obtain a third clock signal $Clk_{d3}$.

The fourth delayer 123 is configured to perform delay processing on the third clock signal $Clk_{d5}$ to obtain a fourth clock signal $Clk_{d4}$.

As shown in FIG. 8, after the delay processing, the cycles of the clock signal $Clk_0$, the third clock signal $Clk_{d5}$ and the fourth clock signal $Clk_{d4}$ are misaligned.

The second AND gate 124 is configured to receive the second data signal $Data_2$ from the transmitter, and perform an AND operation on the third clock signal $Clk_{d3}$, the fourth clock signal $Clk_{d4}$ and the second data signal $Data_2$ to obtain a to-be-negative pulse signal $Pulse_b$ after performing pulse modulation on the second data signal $Data_2$.

The negative converter 125 is configured to perform negative processing on the to-be-negative pulse signal Pulse to obtain a second to-be-synthesized pulse signal $Pulse_c$.

The negative processing is performed on the to-be-negative pulse signal $Pulse_b$ by: converting a positive pulse in the to-be-negative pulse signal to a negative pulse; and/or converting a negative pulse in the to-be-negative pulse signal to a positive pulse.

As shown in FIG. 8, the to-be-negative pulse signal $Pulse_b$ only includes positive pulses, so that all the positive pulses in the to-be-negative pulse signal $Pulse_b$ are converted to negative pulses to obtain the second to-be-synthesized pulse signal $Pulse_c$.

As mentioned above, after the signal generator 1 receives two data signals from the transmitter, the target predetermined sub-rule is selected from the first predetermined rule based on the number of data signals. As shown in FIG. 8, the signal processing logic of the first signal unit 12 is consistent with a processing logic of the target predetermined sub-rule corresponding to two data signals.

The second signal synthesizer 13 synthesizes the first to-be-synthesized pulse signal $Pulse_a$ and the second to-be-synthesized pulse signal $Pulse_c$ to obtain the pulse signal $Pulse_1$.

Figure 9:
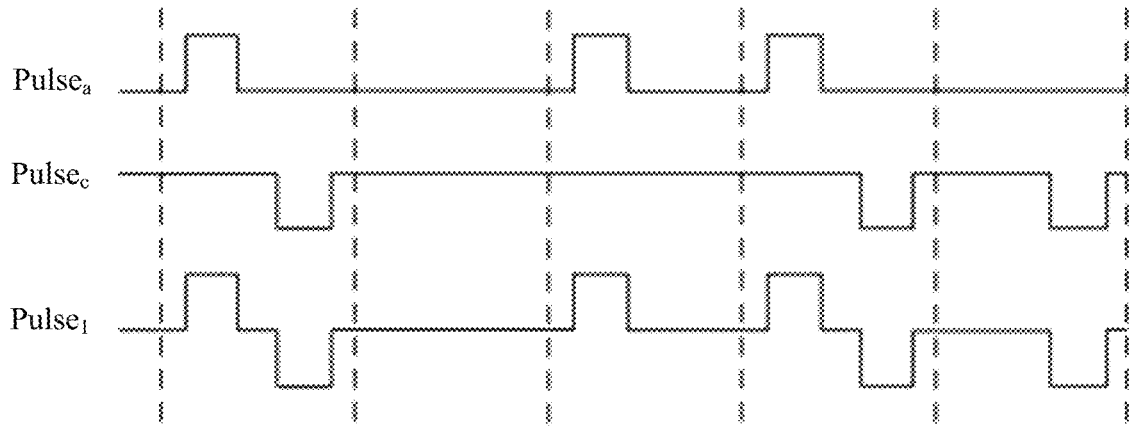
FIG. 9 is a schematic diagram of synthesizing to-be-synthesized pulse signals according to an embodiment of the present disclosure.

Reference is made to FIG. 9, which is a schematic diagram of synthesizing to-be-synthesized pulse signals according to an embodiment of the present disclosure.

The first to-be-synthesized pulse signal $Pulse_a$ and the second to-be-synthesized pulse signal $Pulse_c$ are superimposed to obtain the pulse signal $Pulse_1$.

On the basis of the structure of the signal generator according to the above embodiments of the present disclosure, the signal generator includes: a first signal unit, a second signal unit and a second signal synthesizer. The first signal unit receives a first data signal from the transmitter, and generates a first to-be-synthesized pulse signal based on a clock signal, the first data signal and a first predetermined rule. The second signal unit inverts a phase of the clock signal to obtain a phase-inverted clock signal, receives a second data signal from the transmitter, generates a to-be-negative pulse signal based on the phase-inverted clock signal, the second data signal and the first predetermined rule, and perform negative processing on the to-be-negative pulse signal to obtain a second to-be-synthesized pulse signal. The second signal synthesizer synthesizes the first to-be-synthesized pulse signal and the second to-be-synthesized pulse signal to obtain the pulse signal. According to the present disclosure, the pulse signal is generated by using the signal generator based on the data signal and the first predetermined rule, thereby performing data transmission using the pulse signal.

Figure 10:
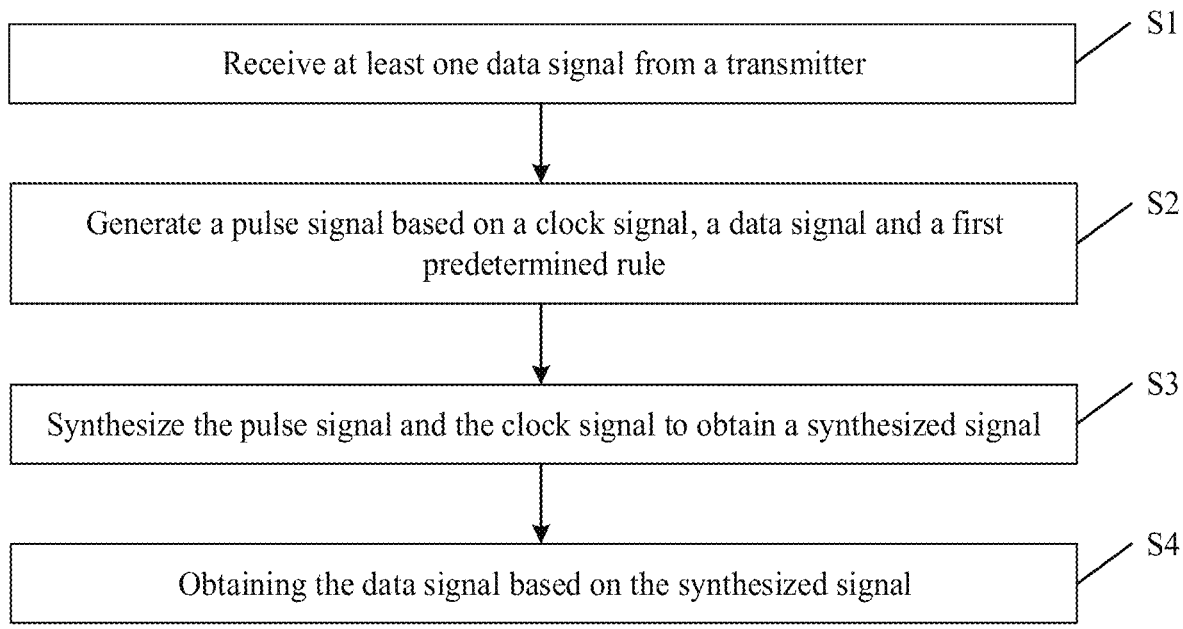
FIG. 10 is a flowchart of a method for data transmission according to an embodiment of the present disclosure.

On the basis of the circuit for data transmission according to the above embodiments of the present disclosure, FIG. 10 shows a flowchart of a method for data transmission according to an embodiment of the present disclosure. The method for data transmission is applied to the circuit for data transmission according to the embodiments of the present disclosure.

The method for data transmission includes the following steps S1 to S4.

In step S1, the at least one data signal is received from the transmitter.

In step S2, a pulse signal is generated based on a clock signal, the data signal and a first predetermined rule.

In the step S2, the clock signal is inputted from an external clock, and the frequency of the clock signal may be predetermined.

It should be noted that the frequency of the pulse signal is consistent with the frequency of the clock signal, and the pulse width and the pulse position of the pulse signal may be configured according to requirements.

The first preset rule includes multiple different predetermined sub-rules, and the predetermined sub-rules correspond to the number of data signals received by the signal generator.

In performing step S2, a target predetermined sub-rule corresponding to the number of data signals is selected from the multiple predetermined sub-rules.

The pulse signal is generated based on the clock signal, the at least one data signal and the target predetermined sub-rule.

In step S3, the pulse signal and the clock signal are synthesized to obtain a synthesized signal.

In the step S3, the synthesis rule is not limited, and the following example is provided for illustration.

For example, in a same cycle, in a case that the clock signal is at a high level and the pulse signal is a positive pulse, the clock signal at the high level is synthesized with the positive pulse to obtain a level signal greater than the high level of the clock signal.

In a case that the clock signal is at a low level and the pulse signal is a negative pulse, the clock signal at the low level is synthesized with the negative pulse to obtain a level signal smaller than the low level of the clock signal.

Level signals synthesized in all cycles form the synthesized signal.

In step S4, the data signal is obtained based on the synthesized signal.

In the step S4, the data signal obtained by restoring after consistent with the data signal transmitted by the transmitter.

In performing the step S4, for each of cycles of the synthesized signal, a data signal value corresponding to the cycle is determined based on a level of the synthesized signal in the cycle and a second predetermined rule.

The data signal is obtained based on data signal values corresponding to all the cycles.

The method for data transmission according to the embodiments of the present disclosure corresponds to the circuit for data transmission described in the above embodiments of the present disclosure. The specific implementation process and relevant explanations may be referred to each other, which are not repeated herein.

In the method for data transmission according to the embodiments of the present disclosure, the signal generator receives at least one data signal from a transmitter, generates a pulse signal based on the clock signal, the data signal and a first predetermined rule, and transmits the pulse signal to the first signal synthesizer. The first signal synthesizer synthesizes the pulse signal and the clock signal to obtain a synthesized signal, and transmits the synthesized signal to the voltage comparator. The voltage comparator obtains the data signal based on the synthesized signal. According to the present disclosure, the pulse signal is generated based on the clock signal, the first predetermined rule, and the data signal received from the transmitter. The pulse signal and the clock signal are synthesized to obtain a synthesized signal, and the synthesized signal is transmitted to the receiver. The receiver obtains the data signal based on the synthesized signal. Therefore, the data signal is transmitted using the pulse signal and the clock signal without adding circuit lines or complicating circuit structure, ensuring the data transmission performance while simplify the circuit lines and the circuit structure, and realizing direct-current balance of the circuit.

The embodiments of the present disclosure are described in a progressive manner herein. The same and similar parts between the various embodiments may be referred to each other. Each embodiment focuses on its differences from other embodiments. In particular, the system or system embodiment is basically similar to the method embodiment, and therefore is described relatively briefly. For relevant details, reference can be made to the corresponding description of the method embodiment. The system and system embodiments described above are only illustrative, in which the units described as separate components may or may not be physically separated, and the components shown as units may or may not be physical units, that is, may be located in one place, or distributed over multiple network elements. Some or all of the modules may be selected as needed to achieve the purpose of the solution of the embodiments. Those skilled in the art can understand and implement the solution without any creative effort.

Those skilled in the art may further realize that the units and algorithm steps of each example described in conjunction with the embodiments disclosed herein may be implemented by electronic hardware, computer software, or a combination of both. In order to clearly illustrate the interchangeability of hardware and software, the modules and steps of each example have been described in general terms of functionality in the above description. Whether these functions are performed in hardware or software depends on the specific application and design constraints of the technical solution. Those skilled in the art may implement the described functionality in various manners for each specific application, while such implementations should not be considered to be beyond the scope of the present disclosure.

With the description of the embodiments disclosed above, those skilled in the art may implement or use the present disclosure. Various modifications made to the embodiments are apparent to those skilled in the art, and the general principles defined herein may be implemented in other embodiments without departing from the spirit or scope of the present disclosure. Therefore, the present disclosure is not limited to the embodiments described herein, but should comply with the widest scope consistent with the principles and novel features disclosed herein.

The invention claimed is:

1. A circuit for data transmission, comprising:
a signal generator;
a first signal synthesizer; and
a voltage comparator; wherein
an output terminal of the signal generator is connected to an input terminal of the first signal synthesizer;
an output terminal of the first signal synthesizer is connected to an input terminal of the voltage comparator;
a clock terminal of the signal generator and a clock terminal of the first signal synthesizer are configured to receive a clock signal externally inputted;
the signal generator is configured to receive at least one data signal from a transmitter, generate a pulse signal based on the clock signal, the data signal and a first predetermined rule, and transmit the pulse signal to the first signal synthesizer;
the first signal synthesizer is configured to synthesize the pulse signal and the clock signal to obtain a synthesized signal, and transmit the synthesized signal to the voltage comparator; and
the voltage comparator is configured to obtain the data signal based on the synthesized signal.

2. The circuit according to claim 1, wherein
the signal generator comprises: a first signal unit, a second signal unit and a second signal synthesizer;
a clock terminal of the first signal unit and a clock terminal of the second signal unit are configured to receive the clock signal externally inputted;
an output terminal of the first signal unit and an output terminal of the second signal unit are connected to an input terminal of the second signal synthesizer;
an output terminal of the second signal synthesizer is connected to the input terminal of the first signal synthesizer;
the first signal unit is configured to receive a first data signal from the transmitter, generate a first to-be-synthesized pulse signal based on the clock signal, the first data signal and a first predetermined rule;
the second signal unit is configured to invert a phase of the clock signal to obtain a phase-inverted clock signal, receive a second data signal from the transmitter, generate a to-be-negative pulse signal based on the phase-inverted clock signal, the second data signal and the first predetermined rule, and perform negative processing on the to-be-negative pulse signal to obtain a second to-be-synthesized pulse signal; and
the second signal synthesizer is configured to synthesize the first to-be-synthesized pulse signal and the second to-be-synthesized pulse signal to obtain the pulse signal.

3. The circuit according to claim 2, wherein
the first signal unit comprises: a first delayer, a second delayer and a first AND gate;
an output terminal of the first delayer is connected to an input terminal of the second delayer and a second input terminal of the first AND gate;
a clock terminal of the first delayer is configured to receive the clock signal externally inputted;
an output terminal of the second delayer is connected to a third input terminal of the first AND gate;
an output terminal of the first AND gate is connected to the input terminal of the second signal synthesizer;
a first input terminal of the first AND gate is configured to receive the first data signal from the transmitter;
the first delayer is configured to perform delay processing on the clock signal to obtain a first clock signal;
the second delayer is configured to perform delay processing on the first clock signal to obtain a second clock signal; and
the first AND gate is configured to receive the first data signal from the transmitter, and perform an AND operation on the first clock signal, the second clock signal and the first data signal to obtain the first to-be-synthesized pulse signal.

4. The circuit according to claim 2, wherein
the second signal unit comprises: a third delayer, a fourth delayer, a second AND gate, an inverter and a negative converter;
an output terminal of the inverter is connected to an input terminal of the third delayer;
a clock terminal of the inverter is configured to receive the clock signal externally inputted;
an output terminal of the third delayer is connected to an input terminal of the fourth delayer and a second input terminal of the second AND gate;
an output terminal of the fourth delayer is connected to a third input terminal of the second AND gate;
a first input terminal of the second AND gate is configured to receive the second data signal from the transmitter;
the inverter is configured to invert the phase of the clock signal to obtain the phase-inverted clock signal;
the third delayer is configured to perform delay processing on the phase-inverted clock signal to obtain a third clock signal;
the fourth delayer is configured to perform delay processing on the third clock signal to obtain a fourth clock signal;
the second AND gate is configured to receive the second data signal from the transmitter, and perform an AND operation on the third clock signal, the fourth clock signal and the second data signal to obtain the to-be-negative pulse signal; and
the negative converter is configured to perform negative processing on the to-be-negative pulse signal to obtain the second to-be-synthesized pulse signal.

5. The circuit according to claim 4, wherein the negative converter is further configured to:
convert a positive pulse in the to-be-negative pulse signal to a negative pulse; and/or
convert a negative pulse in the to-be-negative pulse signal to a positive pulse.

6. The circuit according to claim 1, wherein
the first predetermined rule comprises a plurality of predetermined sub-rules, and the predetermined sub-rules correspond to a number of the data signal received by the signal generator; and
the signal generator is further configured to:
receive the at least one data signal from the transmitter;
select a target predetermined sub-rule corresponding to the number of the data signal from the plurality of predetermined sub-rules; and
generate the pulse signal based on the clock signal, the data signal and the target predetermined sub-rule, and transmit the pulse signal to the first signal synthesizer.

7. The circuit according to claim 1, further comprising a first driver, wherein
an input terminal of the first driver is connected to the output terminal of the signal generator;
an output terminal of the first driver is connected to the input terminal of the first signal synthesizer; and
the first driver is configured to convert a level of the pulse signal outputted by the signal generator to meet a predetermined first level requirement.

8. The circuit according to claim 1, further comprising a second driver, wherein
an output terminal of the second driver is connected to the input terminal of the first signal synthesizer;
an input terminal of the second driver is configured to receive the clock signal; and
the second driver is configured to convert a level of the clock signal to meet a predetermined second level requirement.

9. The circuit according to claim 1, wherein the voltage comparator is further configured to:
determine, for each of cycles of the synthesized signal, a data signal value corresponding to the cycle based on a level of the synthesized signal in the cycle and a second predetermined rule; and
obtain the data signal based on data signal values corresponding to all the cycles.

10. A method for data transmission, applied to the circuit for data transmission according to claim 1, and comprising:
receiving the at least one data signal from the transmitter;
generating the pulse signal based on the clock signal, the data signal and the first predetermined rule;
synthesizing the pulse signal and the clock signal to obtain the synthesized signal; and
obtaining the data signal based on the synthesized signal.

* * * * *